(12) United States Patent
Frizzell et al.

(10) Patent No.: US 11,990,738 B2
(45) Date of Patent: May 21, 2024

(54) CABLE SUPPORT ASSEMBLY

(71) Applicant: CMP PRODUCTS LIMITED, Newcastle upon Tyne (GB)

(72) Inventors: Lee Frizzell, Cramlington (GB); David Robinson, Cramlington (GB)

(73) Assignee: CMP PRODUCTS LIMITED, Newcastle upon Tyne (GB)

( * ) Notice: Subject to any disclaimer, the term of this patent is extended or adjusted under 35 U.S.C. 154(b) by 443 days.

(21) Appl. No.: 17/049,998

(22) PCT Filed: Jun. 11, 2019

(86) PCT No.: PCT/EP2019/065143
§ 371 (c)(1),
(2) Date: Oct. 23, 2020

(87) PCT Pub. No.: WO2020/001969
PCT Pub. Date: Jan. 2, 2020

(65) Prior Publication Data
US 2021/0184445 A1     Jun. 17, 2021

(30) Foreign Application Priority Data
Jun. 29, 2018   (EP) .................................... 18180936

(51) Int. Cl.
*H02G 3/30* (2006.01)
*H02G 1/02* (2006.01)
(Continued)

(52) U.S. Cl.
CPC ................. *H02G 3/30* (2013.01); *H02G 1/02* (2013.01); *H02H 3/32* (2013.01); *H02H 9/08* (2013.01)

(58) Field of Classification Search
CPC .. H02G 3/30; H02G 1/02; H02G 3/32; H02G 9/08; H02G 1/00; H02G 3/0418;
(Continued)

(56) References Cited

U.S. PATENT DOCUMENTS 2,470,814 A    5/1949 Max
4,366,939 A *  1/1983 McMillan ............... F16L 3/223
                                                      D8/356

(Continued)

FOREIGN PATENT DOCUMENTS

EP    1973211 A1    9/2008
EP    2806198 A1    11/2014
(Continued)

OTHER PUBLICATIONS

International Search Report and Written Opinion for PCT/EP2019/065143, mailed Jun. 28, 2019.

*Primary Examiner* — Kimberly T Wood
(74) *Attorney, Agent, or Firm* — Billion & Armitage (57) ABSTRACT

A cable support assembly (2) for supporting a cable assembly (4) including a plurality of cables (6, 8, 10) is disclosed. The cable support assembly comprises a support (18) and cable retaining devices for supporting the cable assembly such that a joint (12, 14, 16) between first and second sections (6a, 6b; 8a, 8b; 10a, 10b) of at least one cable is arranged on a side of the cable assembly facing away from the support and is spaced further from the support than sections of the cable located remote from the joint.

8 Claims, 8 Drawing Sheets

(51) Int. Cl.
 *H02H 3/32* (2006.01)
 *H02H 9/08* (2006.01)

(58) Field of Classification Search
 CPC ... H02H 3/32; H02H 9/08; F16L 37/52; F16L 39/04; F16L 39/06; F16L 57/00; F16L 21/06; F16L 37/02; F16L 3/01; F16L 3/10; F16L 3/1091; F16L 3/16; F16L 3/22; F16L 47/04
 USPC .... 285/25, 28, 87, 121.6, 145.2, 157.1, 272, 285/148.8
 See application file for complete search history.

(56) References Cited

U.S. PATENT DOCUMENTS

| | | | | |
|---|---|---|---|---|
| 5,730,399 | A * | 3/1998 | Baginski | H02G 3/263 248/68.1 |
| 5,742,982 | A * | 4/1998 | Dodd | F16L 3/22 248/74.1 |
| 5,820,083 | A * | 10/1998 | Geiger | F16L 3/137 248/68.1 |
| 6,119,668 | A * | 9/2000 | Richards | F02P 11/00 123/635 |
| 6,142,428 | A * | 11/2000 | Kamata | F16L 3/22 248/74.1 |
| 6,710,249 | B1 * | 3/2004 | Denton | H02G 3/24 174/152 G |
| 7,654,492 | B2 * | 2/2010 | Balderama | F16L 3/243 248/74.2 |
| 8,020,811 | B2 * | 9/2011 | Nelson | F16L 3/2235 248/65 |
| 9,353,892 | B2 * | 5/2016 | Frizzell | H02G 7/10 |
| 9,404,605 | B2 * | 8/2016 | Booth | H02G 7/053 |
| 10,677,384 | B2 * | 6/2020 | Rolston | F16L 39/04 |

FOREIGN PATENT DOCUMENTS

| | | |
|---|---|---|
| EP | 3165803 A1 | 5/2017 |
| GB | 2389970 A | 12/2003 |
| JP | H0630513 A | 2/1994 |
| WO | 2003085308 A1 | 10/2003 |

* cited by examiner

CABLE SUPPORT ASSEMBLY

This application is a National Stage Application of PCT/EP2019/065143, filed on Jun. 11, 2019, which claims benefit of application Ser. No. 18/180,936.9, filed on Jun. 29, 2018 in Europe and which applications are incorporated herein by reference. A claim of priority to all, to the extent appropriate, is made.

The present disclosure relates to a cable support assembly, and relates particularly, but not exclusively, to a cable support assembly for supporting power cables in confined spaces.

In certain applications, such as power cables for underground railways, power cables often have lengths exceeding 1 kilometre, a typical length of cable wound onto a drum for transportation to an installation location. As a result, lengths of cable need to be joined end to end. The diameter of a cable joint is often significantly larger than the diameter of a region of the cable where no joint occurs, especially in the case of 3-phase power cable assemblies, where the assembly includes a cable for each phase. As a result, cable joints are often formed in spaces located to the side of the cable, with the cable being directed into the space containing the joint. However, this arrangement suffers from the drawback that it is difficult to provide cable joints in confined spaces.

Preferred embodiments of the present disclosure seek to overcome one or more of the above disadvantages of the prior art.

According to the present disclosure, there is provided a cable support assembly adapted to support a cable assembly including a plurality of cables, the cable support assembly comprising a support and a plurality of cable retaining devices adapted to support the cable assembly such that a joint between first and second sections of at least one said cable is arranged on a side of the cable assembly facing away from the support and is spaced further from the support than sections of the cable located remote from the joint.

By providing a plurality of cable retaining devices adapted to support the cable assembly such that a joint between first and second sections of at least one cable is arranged on a side of the cable assembly facing away from the support and is spaced further from the support than sections of the cable located remote from the joint, this provides the advantage of enabling a joint in the cable to be formed in a confined space.

The cable support assembly may be adapted to support the cable assembly having a plurality of said joints, wherein said joints are separated from each other in an axial direction of the cable assembly.

This provides the advantage of making the cable assembly when supported by the cable support assembly more compact.

The cable support assembly may include at least one first said cable retaining device adapted to retain at least one said cable of said cable assembly, wherein at least one said first cable retaining device has a respective body portion adapted to be mounted to a support and a respective cable retaining part for retaining at least one said cable and pivotably mounted to said body portion.

By providing at least one said first cable retaining device having a respective body portion adapted to be mounted to a support and a respective cable retaining part for retaining at least one said cable and pivotably mounted to said body portion, this provides the advantage of enabling the cable support assembly to effectively support the cable while avoiding applying excessive bending forces to the cable.

At least one said cable retaining portion may be pivotably mounted to the corresponding said body portion via a respective first axis and the corresponding said body portion may be adapted to be pivotably mounted to the support via a respective second axis, not parallel to said first axis.

The cable support assembly may comprise at least one second cable retaining device adapted to support a plurality of cables on a side of the cable assembly facing the support.

The cable support assembly may include at least one third cable retaining device adapted to support a plurality of cables such that at least one said cable supported by the third cable retaining device is located further from the support than at least one further said cable supported by the third cable retaining device.

The cable support assembly may comprise a plurality of fourth cable retaining devices adapted to support a plurality of cables in different orientations relative to the support.

This provides the advantage of enabling effective support of the cable assembly in the transition between one cable of the cable assembly facing away from the support and another cable of the cable assembly facing away from the support.

At least one said cable retaining device may comprise a respective retaining portion adapted to retain at least one said cable of said cable assembly and having a respective first part adapted to be mounted to a respective second part wherein one of the first and second parts is at least partly received in the other of the first and second parts to enable cables of different diameters to be retained.

At least one said cable retaining portion may further comprise insulator means for preventing electrical conduction from at least one said cable to a surface of the cable retaining portion facing away from said cable.

The insulator means may comprise at least one insulator member extending from a respective said cable retaining portion to lengthen an electrical conduction path from at least one said cable to the surface of the cable retaining portion facing away from said cable.

A preferred embodiment of the disclosure will now be described, by way of example only and not in any limitative sense, with reference to the accompanying drawings, in which.

Figure 1:
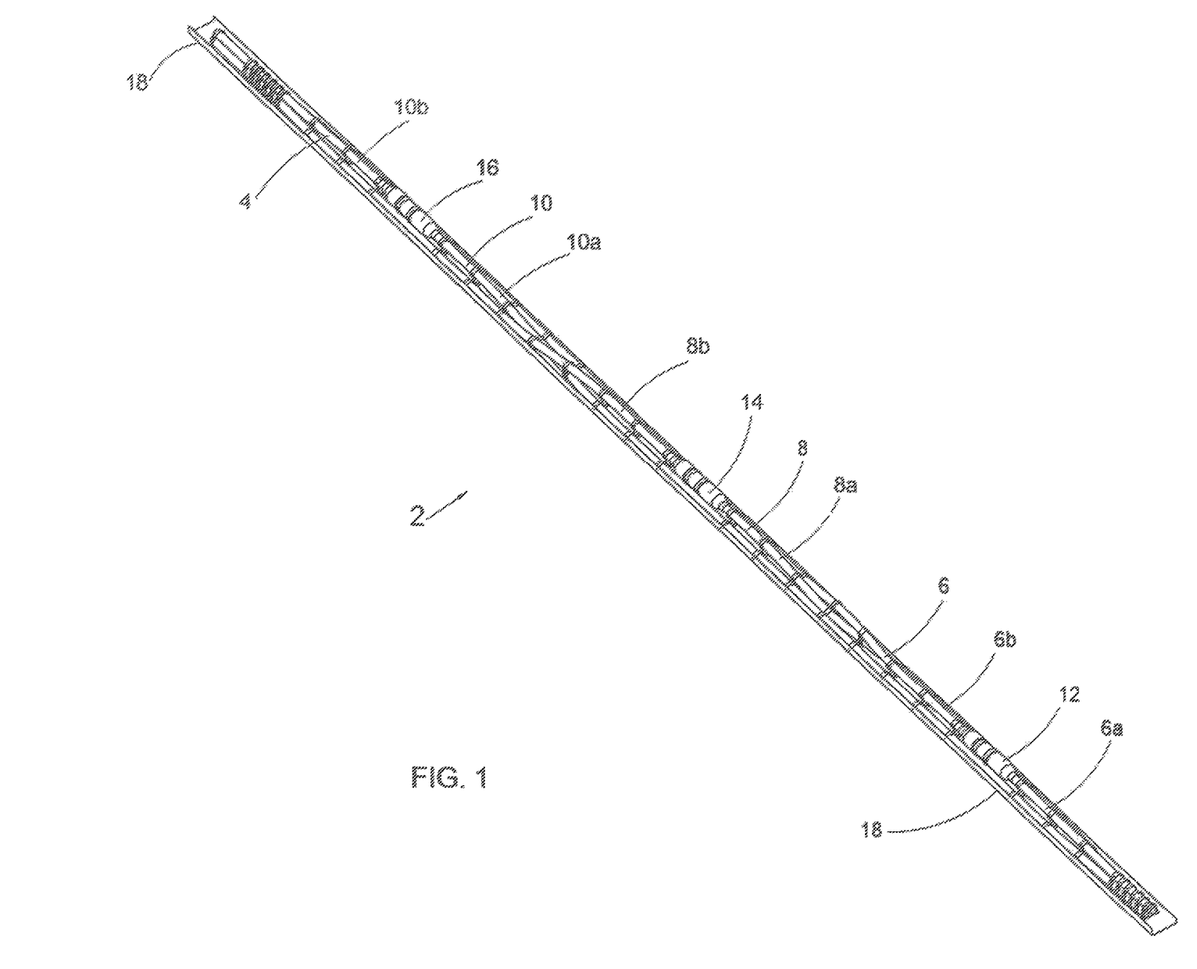
FIG. 1 is a perspective view of a cable support assembly embodying the present disclosure and supporting a cable assembly with joints.

Referring to FIG. 1, a cable support assembly 2 embodying the present disclosure supports a cable assembly 4 in the form of a power cable assembly having three cables 6, 8, 10, one cable 6, 8, 10 for each phase. Each of the cables 8, 8, 10 has a respective joint 12, 14, 16 joining respective pairs of sections 6a and 6b, 8a and 8b, 10a and 10b of the cable 6, 8, 10 end to end. The cable support assembly 2 includes a support in the form of a cable tray 18 for supporting the cable assembly 4 and which is mounted to a fixed structure (not shown) such as a support member on a wall of an enclosure for receiving the cable assembly 4.

Figure 2:
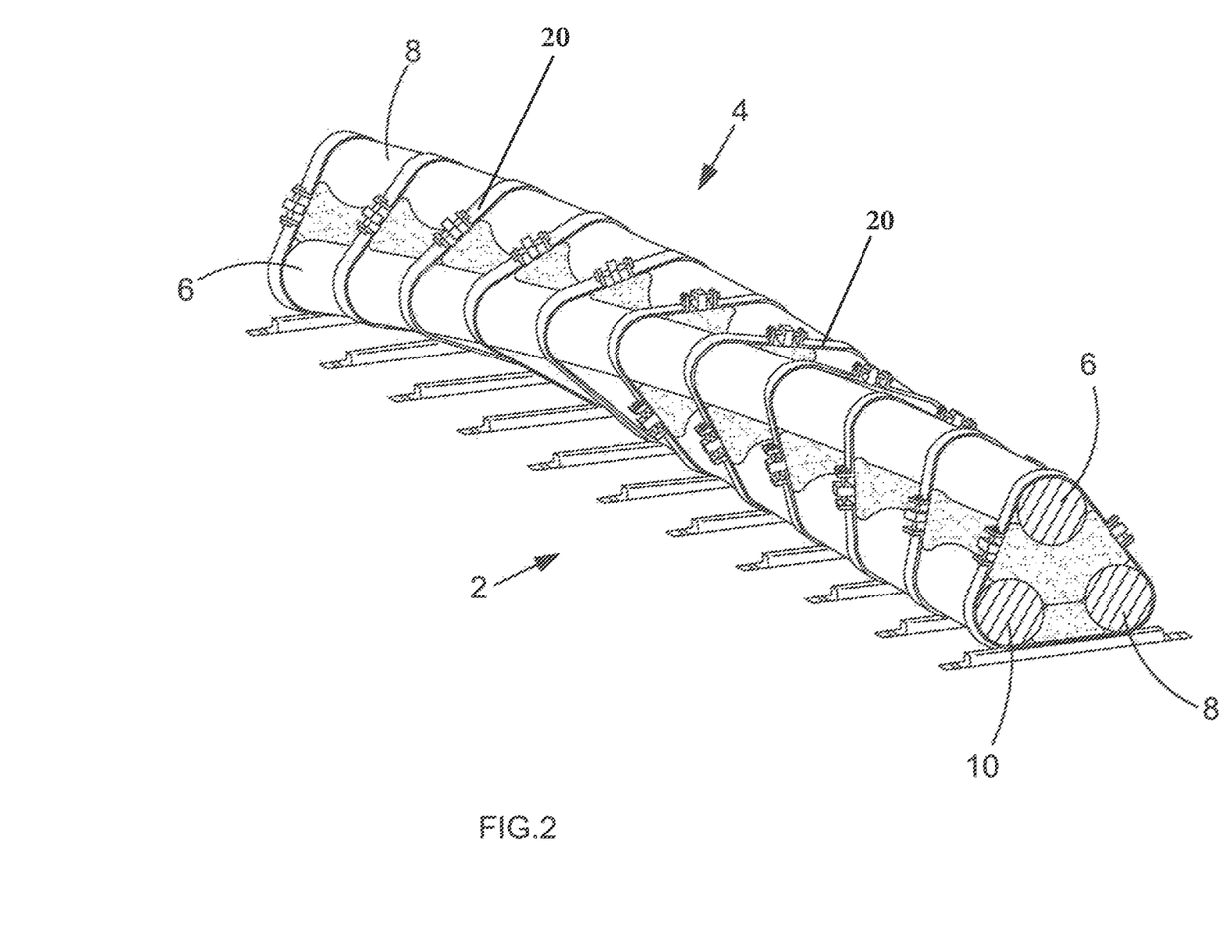
FIG. 2 is a partly perspective cross sectional view along the line II-II of the cable support assembly and cable assembly of FIG. 1.

The joints 12, 14, 16 between the respective pairs of sections 6a and 6b, 8a and 8b, 10a and 10b of cables 6, 8, 10 are arranged such that each joint 12, 14, 16 is located on a side of the cable assembly 4 facing away from the cable tray 18 and the joints 12, 14, 16 are spaced from each other in an axial direction of the corresponding cable 6, 8, 10. As can be more clearly seen in FIG. 2, between consecutive joints 12, 14, 16, the cable assembly 4 is held by the cable support assembly 2 such that the cable 6, 8, 10 extending from a respective joint 12, 14, 16 is transposed from a location in which it is on a side of the cable assembly 4 facing away from the cable tray 18, to a position in which it is replaced by another cable 10, 8, 6 facing away from the cable tray 18. This transposition is shown more clearly with reference to FIG. 3, which is described in greater detail below.

Figure 3:
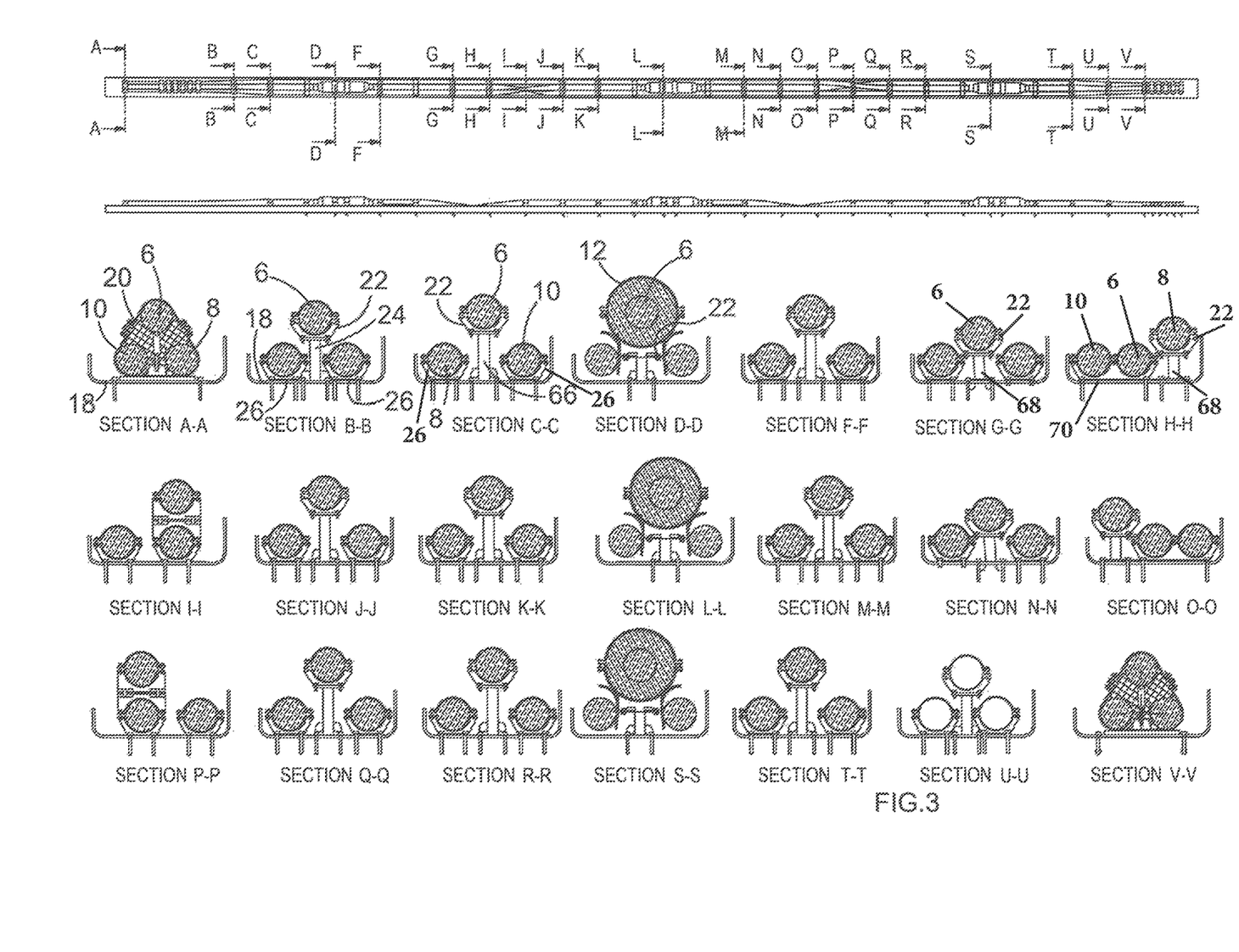
FIG. 3 is a series of schematic cross sectional views along the cable assembly and cable support assembly of FIG. 1.

Referring firstly to FIG. 3, an arrangement containing a joint 12, 14, 16 in each phase cable 6, 8, 10 of the cable assembly 4 is shown. Referring firstly to the cross sectional view along the line A-A, the three cables 6, 8, 10 are held in close proximity to each other in a cable retaining device in the form of a single cable cleat 20. In order to enable the joint 12 to be formed between sections 6a, 6b of the cable 6, the cable 6 extends to the position shown in the view long the line B-B, in which the cable 6 is spaced further from the cable tray 18 than in its position in the view along the line A-A, and the cables 6, 10 are spaced further apart. This is achieved by retaining the cable 6 in a first cable retaining device in the form of a first cable cleat 22, as shown in more detail in FIG. 5, wherein the first cable cleat 22 is connected to the cable tray 18 by means of a bracket 24 of a first length, and the cables 8, 10 are retained in respective fourth cable retaining devices in the form of fourth cable cleats 26, as shown in more detail in FIG. 8.

Figure 5:
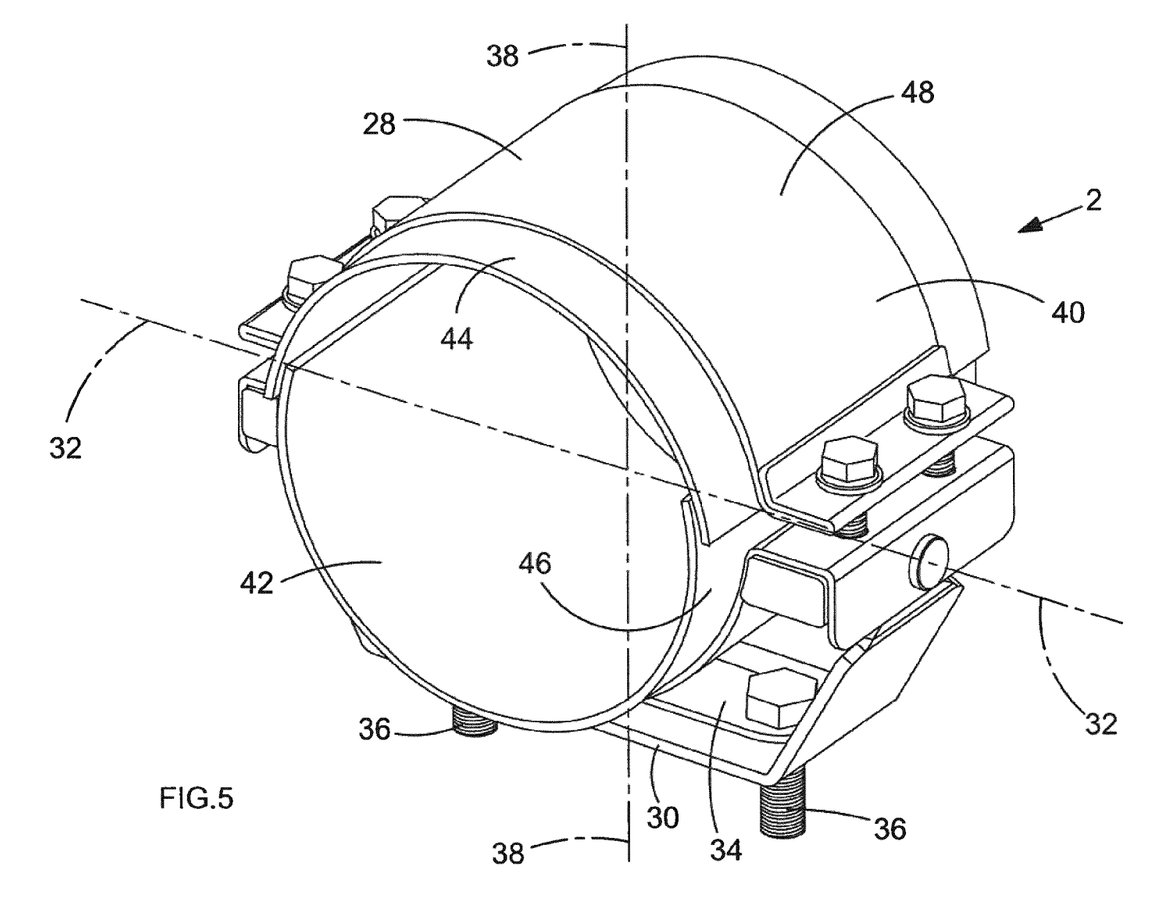
FIG. 5 is a perspective view of a first cable retaining device of the cable support assembly of FIG. 1.

Referring in detail to FIG. 5, the first cable cleat 22 has a cable retaining part 28 for retaining the cable 6 and which is pivotably mounted to a body portion 30 via a first pivot axis 32. The body portion 30 is mounted by means of a mounting member 34 and bolts 36 to a support (not shown), and the bolts 36 pass through respective arcuate slots (not shown) in the body portion 30 to enable the cable retaining part 28 and body portion 30 to pivot about a second pivot axis 38 relative to the support, to accommodate changes in the orientation of the cable 6 as it is being installed. The cable retaining part 28 includes a first part 40 and a second part 42, the ends of which are slidably received in the first part 40 to enable different diameters of cable 6 to be accommodated. Each of the first 40 and second 42 parts is also provided with insulator means in the form of a respective insulator member 44, 46 for preventing electrical conduction from an external surface of the cable 6 to a surface 48 of the cable retaining part 28 facing away from the cable 6, by lengthening the electrical path between the surface 48 and the external surface of the cable 6.

Figure 8:
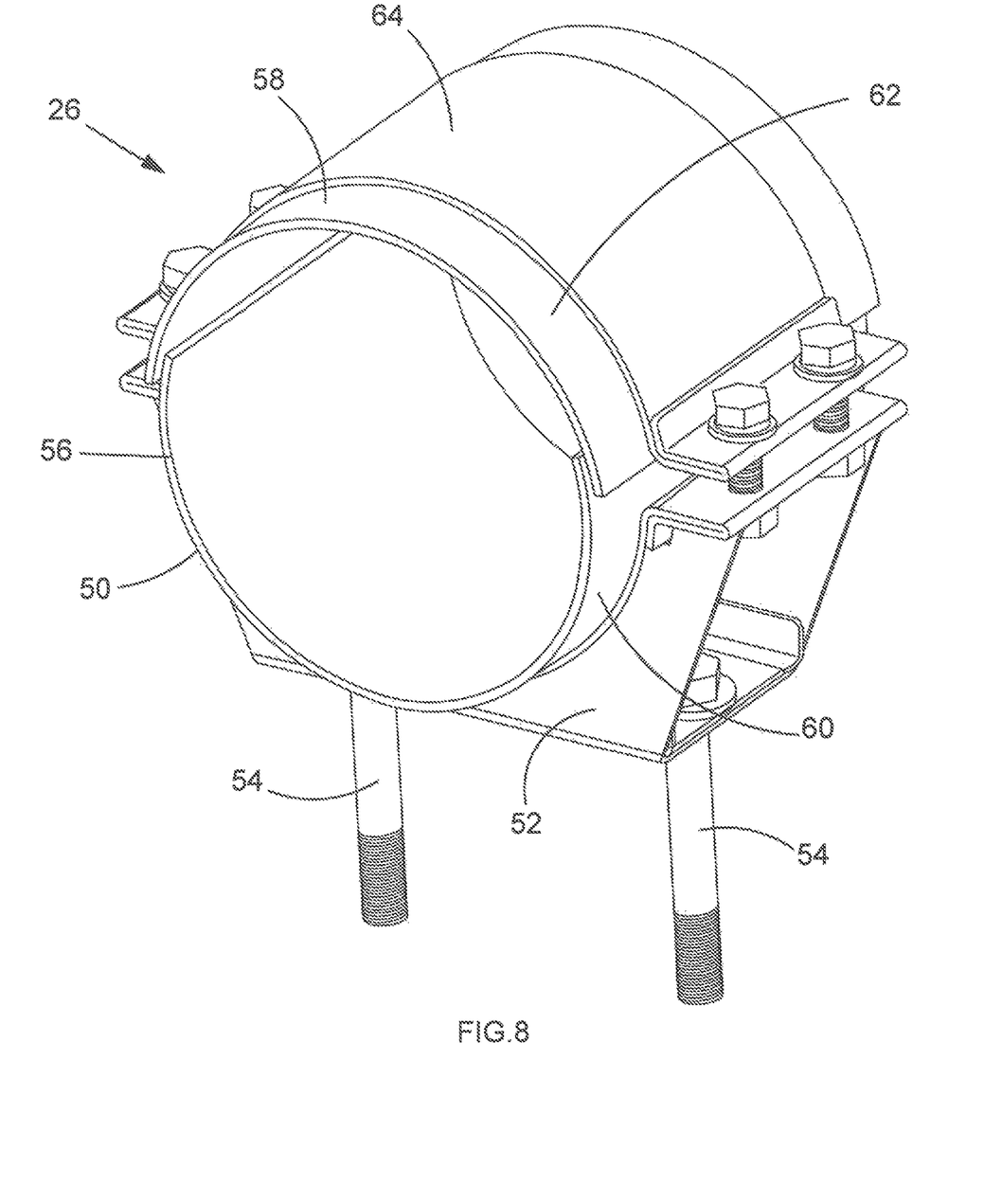
FIG. 8 is a perspective view of a fifth cable retaining apparatus of the cable support assembly of FIG. 1.

Referring to FIG. 8, the fourth cable cleat 26 has a cable retaining part 50 for retaining one of the cables 8, 10 and a body portion 52 mounted by means of bolts 54 to the support (not shown). The cable retaining part 50 includes a first part 56 and a second part 58, the ends of which are slidably received in the first part 56 to enable different diameters of cable 8, 10 to be accommodated, and each of the first 56 and second 58 parts is also provided with insulator means in the form of a respective insulator member 60, 62 for preventing electrical conduction from an external surface of the cable 8, 10 to a surface 64 of the cable retaining part 50 facing away from the cable 8, 10.

Referring again to FIG. 3, in the view along the line C-C, the cable 6 is supported by a further first cable cleat 22 mounted to a bracket 66 of a second length, longer than the first length of the bracket 22 shown in the view along the line B-B, and the cables 8, 10 are supported by fourth cable cleats 26 identical to those shown in the view along the line B-B, but arranged further apart. In the arrangement shown in the view along line D-D the joint 12 of the cable 6 is then supported in a further first cable cleat 22. The arrangement shown in the view along the line F-F is then substantially the same as that of the view along the line C-C, and the arrangement shown in the view along the line G-G corresponds substantially to that along the line B-B, but the cable 6 is supported by means of a further first cable cleat 22, mounted to a bracket 68 of a third length, shorter than the first length.

Figure 6:
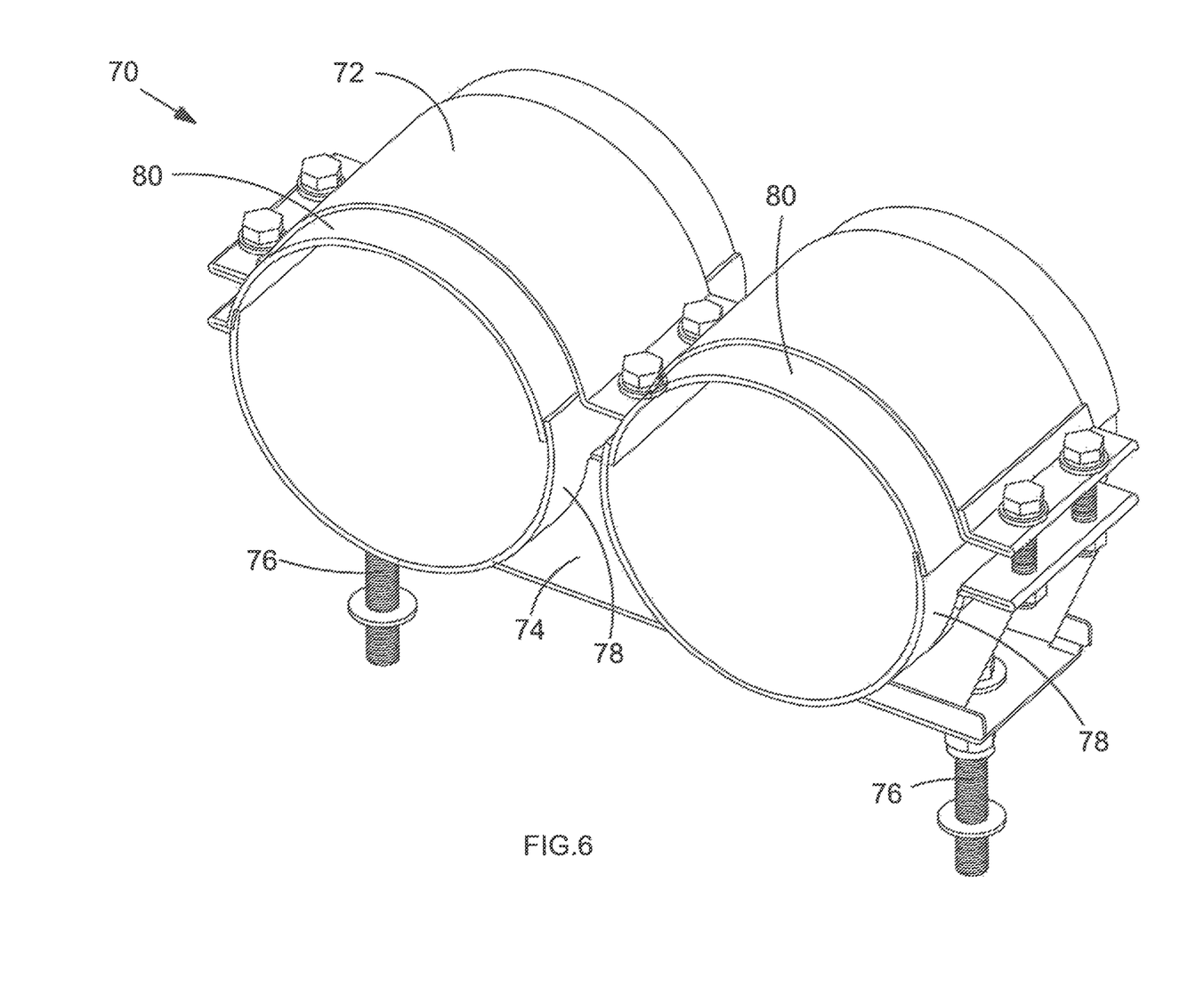
FIG. 6 is a perspective view of a second cable retaining device of the cable support assembly of FIG. 1.

In the arrangement shown in the view along the line H-H, the cable 8 is supported by a first cable cleat 22 having a bracket 68 of the third length, and the cables 6, 10 are supported in a side by side arrangement by means of a second cable cleat 70, as shown in detail in FIG. 6. In this way, the cable 8 is located further from the cable tray 18 than the other cables 6, 10.

Referring in detail to FIG. 6, the second cable cleat 70 has a cable retaining part 72 for retaining a pair of cables 6, 10 and a body part 74 mounted to the support (not shown) by means of bolts 76. The cable retaining part 72 is provided with insulator members 78, 80, which serve the same purpose as the insulator members 60, 62 respectively.

Figure 7:
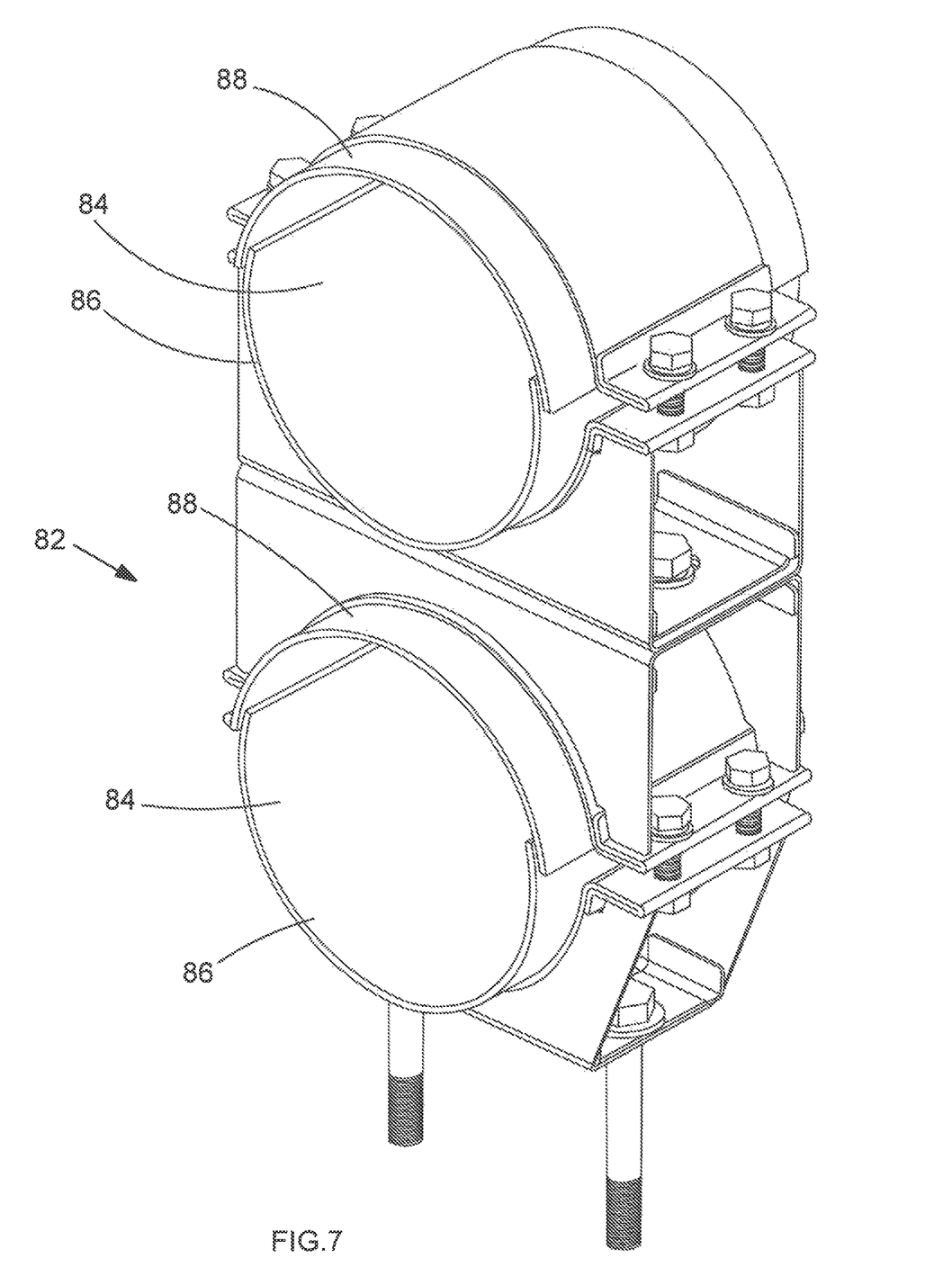
FIG. 7 is a perspective view of a third cable retaining device of the cable support assembly of FIG. 1.

Referring back to FIG. 3, in the view along the line I-I, the cable 8 is located above the cable 6, and the cables 6, 8 are supported in a third cable retaining device in the form of a third cable cleat 82 shown in more detail in FIG. 7. The third cable cleat 82 has a cable retaining part 84 for retaining the cables 6, 8 and is provided with insulator members 86, 88, which serve the same purpose as the insulator members 60, 62 respectively.

The arrangement shown in the views along the lines J-J to N-N then correspond to those shown in the views along the lines B-B to G-G, but with the cables 6, 8 interchanged in position. In the view along the line O-O, the cable 10 is supported by a first cable cleat 22 having a bracket 68 of third length, and the cables 6, 8 are supported in a side by side arrangement by means of a second cable cleat 70. The views along the lines P-P to T-T then correspond to those along the lines H-H to M-M but with the cables 8 and 10 interchanged in position. Finally, the views along the lines U-U and V-V correspond to those along the lines B-B to A-A until the cables 6, 8, 10 can be supported by a single cable cleat 20.

Figure 4:
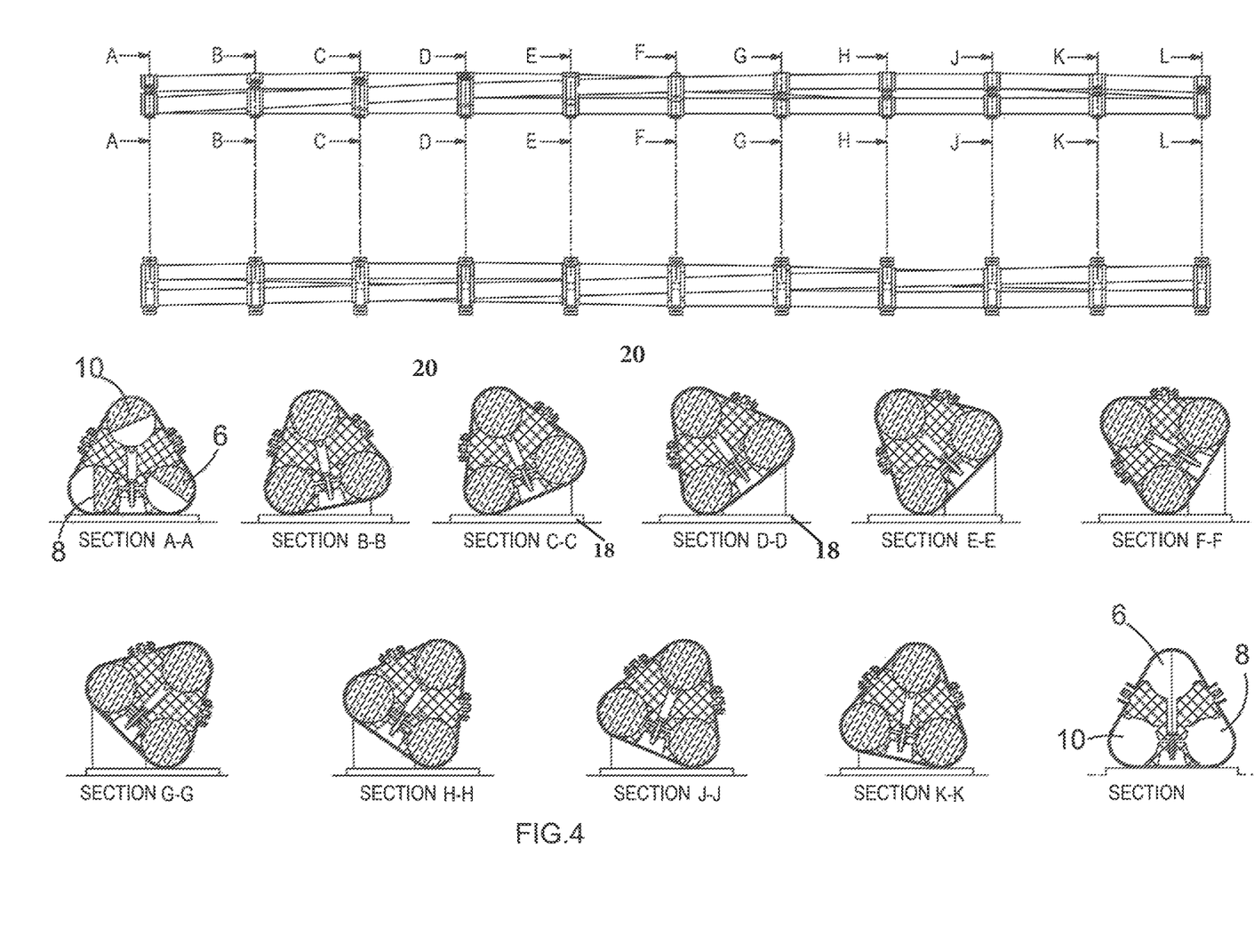
FIG. 4 is a series of schematic cross section views the part of the cable support assembly and cable assembly shown in FIG. 2 and showing a plurality of fourth cable retaining devices of the cable support assembly of FIG. 1.

Referring to FIG. 4, the following length of the cable is transposed so that the cables 6, 8, 10 are in the same orientation as in the view along the line A-A in FIG. 3 by means of a series of single cable cleats 20 mounted in different orientations relative to the cable tray 18.

It will be appreciated by persons skilled in the art that the above embodiment has been described by way of example only and not in any limitative sense, and that various alterations and modifications are possible without departure from the scope of the disclosure as defined by the appended claims.

The invention claimed is:

1. A cable support assembly adapted to support a cable assembly including a plurality of cables and a plurality of joints, each said cable having it least one respective said joint between respective first and second sections of said cable, wherein said joints are located at respective first locations spaced from each other in an axial direction of the cable assembly, the cable support assembly comprising:
   a support member; and
   a plurality of cable cleats adapted to be mounted to the support member and to support the cable assembly, wherein said cable cleats include a plurality of first cable cleats adapted to support a respective said joint on a side of the cable assembly facing away from the support member and at a first distance from the support member, and a plurality of second cable cleats, wherein each said second cable cleat is adapted to support a respective section of the cable located adjacent to a said joint at a second distance from the support member, wherein the first distance is greater than the second distance, wherein at least one said first cable cleat has a respective body portion adapted to be mounted to the support member and a respective cable retaining part for retaining at least one said cable and pivotably mounted to said body portion.

2. A cable support, assembly according to claim 1, wherein a plurality of said joints of different cables of the cable assembly are separated from each other in an axial direction of the cable assembly.

3. A cable support assembly according to claim 1, further comprising at least one third cable cleat adapted to support one or more cables of the plurality of cables on a side of the cable assembly facing the support member.

4. A cable support assembly according to claim 1, further comprising at least one fourth cable cleat adapted to support one or more cables of the plurality of cables such that at least one said cable supported by the fourth cable cleat is located further from the support member than at least one further said cable supported by the fourth cable cleat.

5. A cable support assembly according to claim 1, further comprising a plurality of fifth cable cleats adapted to support said cables in different orientations relative to the support member.

6. A cable support assembly according to claim 1, wherein at least one said cable cleat comprises a respective cable retaining portion adapted to retain at least one said cable of said cable assembly and having a respective first part adapted to be mounted to a respective second part wherein one of the first part and the second part is at least partly received in the other of the first part and the second part to enable cables of different diameters to be retained.

7. A cable support assembly according to claim 6, wherein at least one said cable retaining portion further comprises an insulator device for preventing electrical conduction from at least one said cable to a surface of the cable retaining portion facing away from said cable.

8. A cable support assembly according to claim 7, wherein the insulator device comprises at least one insulator member extending from said cable portion to lengthen an electrical conduction path from at least one said cable to the surface of the cable retaining portion facing away from said cable.

* * * * *